United States Patent
Sprenger

(10) Patent No.: US 7,309,044 B2
(45) Date of Patent: Dec. 18, 2007

(54) DEVICE AND METHOD FOR IMPROVING SECURITY DURING THE OPERATION OF AIR TRAFFIC

(75) Inventor: Wilfried Sprenger, Issendorf (DE)

(73) Assignee: Airbus Deutschland GmbH, Hamburg (DE)

( * ) Notice: Subject to any disclaimer, the term of this patent is extended or adjusted under 35 U.S.C. 154(b) by 213 days.

(21) Appl. No.: 10/490,877

(22) PCT Filed: Sep. 27, 2002

(86) PCT No.: PCT/DE02/03659

§ 371 (c)(1),
(2), (4) Date: Jul. 23, 2004

(87) PCT Pub. No.: WO03/029077

PCT Pub. Date: Apr. 10, 2003

(65) Prior Publication Data

US 2004/0251384 A1    Dec. 16, 2004

(30) Foreign Application Priority Data

Sep. 28, 2001   (DE) ............................. 101 48 054

(51) Int. Cl.
*B64D 11/00* (2006.01)
(52) U.S. Cl. .................. 244/118.5; 244/129.5
(58) Field of Classification Search ............ 244/118.5, 244/118.6, 129.5; 109/68
See application file for complete search history.

(56) References Cited

U.S. PATENT DOCUMENTS

| | | | |
|---|---|---|---|
| 3,454,245 A * | 7/1969 | Burkdoll et al. | 244/137.2 |
| 3,658,277 A | 4/1972 | Anderson | |
| 3,811,643 A * | 5/1974 | Pizzo | 244/137.2 |
| 4,112,818 A | 9/1978 | Garehime, Jr. | |
| 4,481,887 A * | 11/1984 | Urbano | 109/3 |

(Continued)

FOREIGN PATENT DOCUMENTS

BE       751505       11/1970

(Continued)

OTHER PUBLICATIONS

Information Paper International Civil Aviation Organization Seventh Meeting of the Civil Aviation Authorities of the SAM Region (RAAC/7-IP/05) Date: Jul. 1-3, 2002 U.S. Actions to Enhance Flightdeck Security (section 2.9).*

*Primary Examiner*—Michael J. Carone
*Assistant Examiner*—Benjamin P Lee
(74) *Attorney, Agent, or Firm*—W. F. Fasse; W. G. Fasse

(57) ABSTRACT

The invention relates to a device for improving security in an aircraft during the operation of air traffic. The invention is characterized in that a security zone (2'), which can be sealed off by controllable access doors (25, 26) and monitored by sensors (24, 31), is provided between the passenger cabin (3) and cockpit (1) areas. The invention also relates to methods for improving security during the operation of air traffic, using said device. The advantage of the invention is that the penetration of the cockpit by unauthorized persons, who could neutralize the functions of the pilot or operational components, can be prevented. Even in the case of a present threat or a terrorist attack, involving the taking of hostages or a threat with the use of violence, the pilots in the cockpit are protected effectively.

13 Claims, 2 Drawing Sheets

U.S. PATENT DOCUMENTS

| | | |
|---|---|---|
| 6,448,907 B1 | 9/2002 | Naclerio |
| 6,474,599 B1 * | 11/2002 | Stomski .................. 244/118.5 |
| 6,696,979 B2 * | 2/2004 | Manten et al. ............. 340/945 |
| 6,766,983 B2 * | 7/2004 | D'Alvia ................... 244/118.5 |
| 6,844,817 B2 * | 1/2005 | Gleine ........................ 340/574 |
| 6,915,986 B2 * | 7/2005 | D'Alvia ................... 244/118.5 |
| 2002/0158166 A1 * | 10/2002 | Lin ......................... 244/118.5 |
| 2003/0006342 A1 * | 1/2003 | Page, Jr. ................. 244/118.5 |
| 2003/0047648 A1 | 3/2003 | Batt et al. |
| 2003/0050745 A1 | 3/2003 | Orton |
| 2003/0052225 A1 * | 3/2003 | Butzlaff ................... 244/118.5 |
| 2003/0052226 A1 * | 3/2003 | Allen ....................... 244/118.5 |
| 2003/0052227 A1 | 3/2003 | Pittman |
| 2003/0052779 A1 * | 3/2003 | Martin et al. ................ 340/541 |
| 2003/0058112 A1 * | 3/2003 | Gleine ..................... 340/573.1 |
| 2003/0066931 A1 * | 4/2003 | Ward ....................... 244/118.5 |
| 2003/0146347 A1 | 8/2003 | Roessner et al. |

FOREIGN PATENT DOCUMENTS

| | | |
|---|---|---|
| BE | 759331 | 5/1971 |
| BE | 761488 | 6/1971 |
| GB | 1207422 | 9/1970 |

* cited by examiner

DEVICE AND METHOD FOR IMPROVING SECURITY DURING THE OPERATION OF AIR TRAFFIC

CROSS-REFERENCE TO RELATED APLICATION

This application is related to U.S. application Ser. No. 10/358,408, filed Feb. 4, 2003 and issued as U.S. Pat. No. 6,925,756 on Aug. 9, 2005 and to U.S. application Ser. No. 10/253,273, filed Sep. 23, 2002 and issued as U.S. Pat. No. 6,844,817 on Jan. 18, 2005.

FIELD OF THE INVENTION

The invention relates to a device for improving the safety during the operation of air traffic in a commercial aircraft as well as to a method using the device.

BACKGROUND INFORMATION

The air traffic operation is increasingly exposed to incursions by unruly passengers and also to terrorist attacks. Thus, particularly, those incidents substantially endanger the flight safety in which access to the sensitive cockpit area is achieved by force. Different technical and personnel and safety measures are in existence for protecting the cockpit. However, these are unsatisfactory in practice. As an example it should be mentioned that armed air marshals who are present incognito among the passengers cannot effectively protect the cockpit in particular instances where hostages are taken and where several terrorists are present. On the other hand it is also not possible to hermetically seal the cockpit from the passenger cabin, for example by a separation wall. Due to operational reasons it is self understood that the cockpit must have an access to the cabin so that authorized persons can enter the cockpit at any time without hindrance and to leave it again. For example, when pilots need to inspect equipment in the cabin or when a flight attendant needs to bring food and when an information exchange with the pilots needs to be maintained.

Accordingly it is an object of the invention to provide safety measures for the cockpit area which achieve an effective protection against an unauthorized penetration of persons into the cockpit. Simultaneously the accessability of authorized persons must be assured.

SUMMARY OF THE INVENTION

According to the invention there is provided: An apparatus for improving the safety of an aircraft having an entrance area between a cockpit and a passenger cabin of said aircraft, said apparatus comprising means for converting said entrance area into a sealed safety zone, said means for converting comprising a controllable access door between said entrance area and said cockpit and a further controllable access door between said entrance area and said passenger cabin, said means for converting further comprising sensors positioned for monitoring at least said safety zone.

According to the invention there is further provided: A method for improving the safety of an aircraft, said method comprising the following steps:

a) converting an entrance area having an entrance door, said entrance area being located between a cockpit and a passenger cabin of said aircraft, into a safety zone by means of a first controllable access door between said safety zone and said passenger cabin, by means of a further controllable access door between said safety zone and said passenger cabin and by means of sensors, b) closing and locking, prior to passenger embarkation on the ground, said first and second controllable access doors, c) permitting a passenger to enter into said safety zone through said entrance door while said first and second access doors remain locked, d) inspecting a passenger present in said safety zone while said first and second controllable access doors remain looked, and e) unlocking and opening said second controllable access door into said cabin when said passenger has passed inspection to permit the passenger to enter the passenger cabin while maintaining said first controllable access door to said cockpit closed and locked.

It is particularly advantageous that the safety in the air traffic operation is improved by the above combination of features. Unauthorized persons cannot penetrate into the cockpit to prevent the proper functioning of pilots or to destroy components that are necessary for proper operation. Even in case of a terrorist attack, when hostages are taken, or when the use of force is threatened, the pilots are effectively protected in the cockpit and gain time in order to perform protective measures against possible terrorists.

BRIEF DESCRIPTION OF THE DRAWINGS

The invention is described in the following with reference to an example embodiment and illustrated in the drawings which show.

Figure 1A:
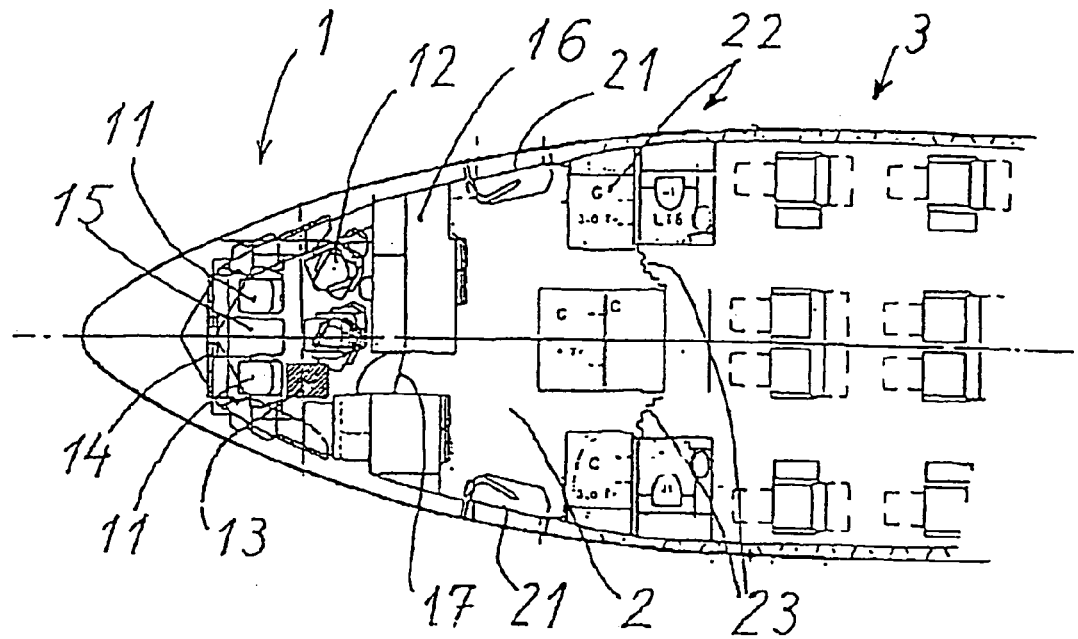
FIG. 1a the top plan view.

DETAILED DESCRIPTION OF PREFERRED EXAMPLE EMBODIMENTS AND OF THE BEST MODE OF THE INVENTION

FIG. 1 shows a front end of the body of a commercial aircraft with the areas: cockpit 1 and passenger cabin 3. Pilot seats 11 and additional seats 12, for example for pilot trainers, are arranged in the cockpit area 1. A trap door 13 is positioned in the cockpit floor for access to avionics components therebelow. In addition to the avionic panel 14 and the center console 15 there are arranged in the cockpit 1 further operationally important components, for example panels for electric, hydraulic, and climate systems not discussed herein in further detail. A pilot resting space 16 is integrated into the cockpit 1 and shown in the drawing. This space may optionally be installed for long distance operation. Normally one reaches the cockpit 1 through a lockable cockpit door 17 which, however by itself is insufficient as a safety device as practice has shown.

Directly bordering on the cockpit there is the boarding area 2 forming the frontmost portion of the passenger cabin 3 and constructed with entrance doors 21 and built-in units 22 which frequently are constructed as galleys and toilets. A certain separation of the area 2 from the cabin is conventionally achieved by a type of folding door or a curtain 23 which, however, serves more for optical than for safety purposes. Thus, among other things, a protection against viewing is to be achieved for the cabin personnel when preparing the meals.

Figure 1B:
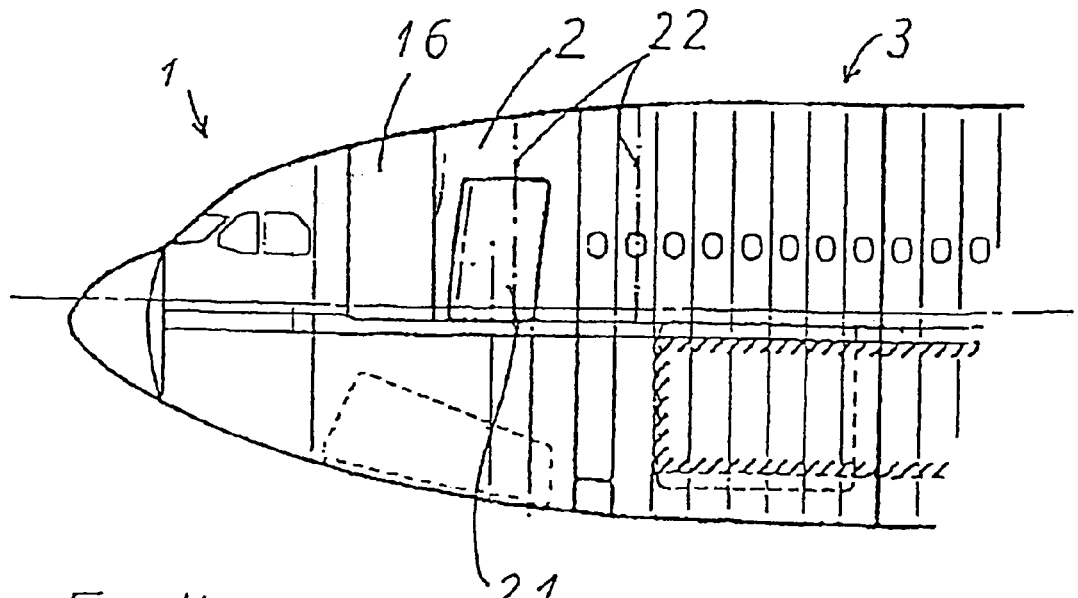
FIG. 1b the side view of a front portion of a commercial aircraft body.

FIG. 1b shows a longitudinal sectional in a side view through the front end of the body with the cockpit area 1, the boarding area 2, and the passenger cabin 3 of the aircraft shown in FIG. 1a.

Figure 2:
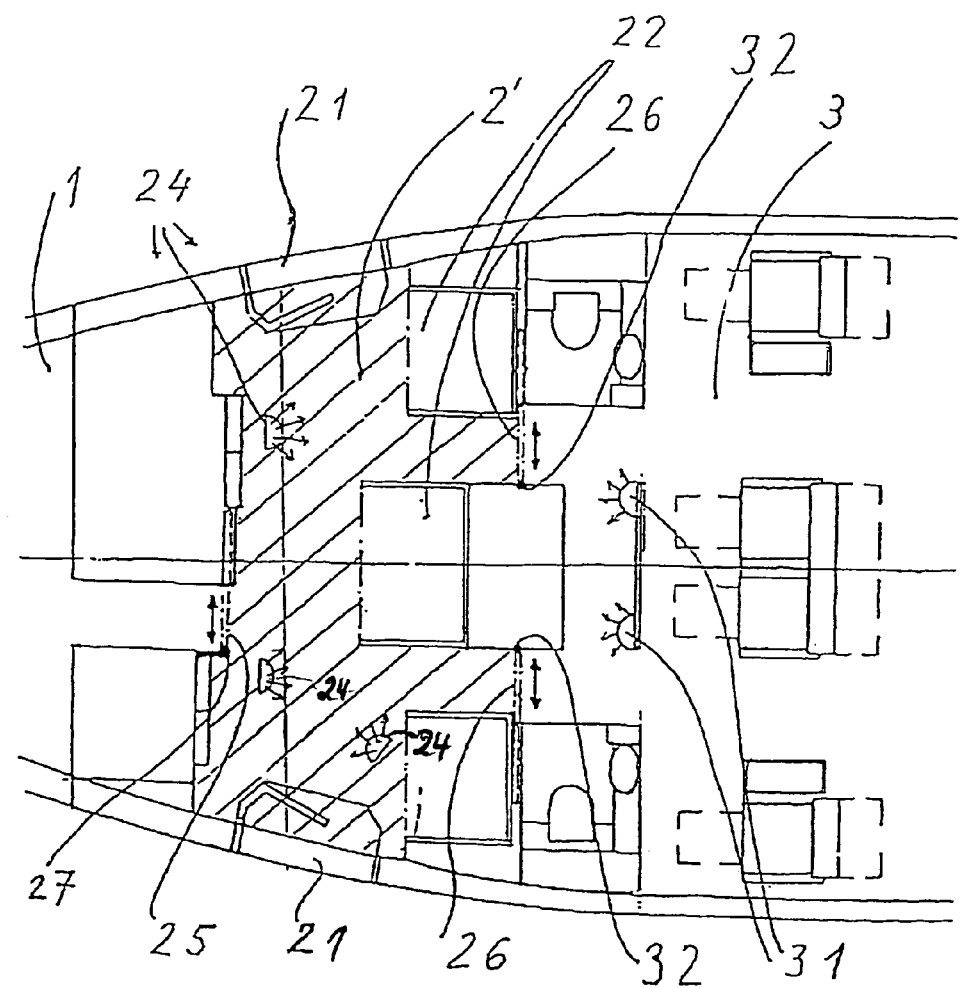
FIG. 2 the top plan view onto the development according to the invention of the sealable safety zone in a schematic illustration.

The construction of the safety zone 2' is shown as a hatched area in FIG. 2 which substantially uses the surface area of the conventional boarding area 2 and does not require any additional space. This sealable area 2' is achieved by the controllable and, if necessary, automatic access doors 25 and 26. Thus, the safety zone 2' is provided with the function of a safety sluice.

The access doors 25 and 26 may be constructed as sliding doors, folding doors, roller doors, or conventional hinged doors, whereby due to the safety aspects respective materials should be selected for rigid explosion-safe and bulletproof doors.

The individual functions of the apparatus can be described as follows: Prior to starting the boarding by the passengers takes place normally when the doors 21 and 26 are open while the door 25 to the cockpit 1 remains closed. If required, initially both access doors 25 and 26 are kept closed prior to starting, while passengers enter individually the safety zone 2' through the entrance door 21. After completion of the check, the access door 26 to the cabin is opened and closed again as soon as the passenger has passed therethrough. This method can be used particularly when the check-in on the ground has safety defects. During the start, while cruising and during landing the doors 25 and 26 remain constantly closed and will be opened only when needed with a sluice function. More specifically, when one door is opened, the other remains closed until persons have entered into the safety zone or have left it.

For assuring the sluice function it is suggested according to the invention that the doors 25 and 26 are constructed as automatic sliding doors in a space-saving embodiment. Other embodiments are also possible. The opening or closing shall take place manually by pressing an operating button or through motion sensors or through conventional sensor means. It is suggested, for example to perform the monitoring of the safety zone 2' and of the space in front of the door 26 (on the cabin side) by means of TV sensors 24 and 31, whereby the pilots are informed by means of a monitor in the cockpit regarding persons in front of or in the safety zone 2'. Thereafter the doors 25 and 26 can be closed or opened by pressing a button.

Similarly, it is possible that the respective open door is automatically closed upon a person passing therethrough by means of a photoelectric barrier 27 or 32 as is, for example, known in connection with elevator doors. For avoiding imposing an additional work load on the pilots it is further possible to provide the cabin personnel with special door operating means for opening the cabin door 26, for example a touch panel, a chip card, or other means for electronically recognizing of body features (electronic thumbprint or electronic eye or face feature recognition). In case an endangerment occurs and unauthorized persons enter into the safety zone 2', the pilot can close all doors so that possibly dangerous persons are locked up in the safety zone 2'. In order to incapacitate these persons temporarily a certain dosage of anaesthesia means or gas can be injected into the atmosphere of the safety zone 2' or the supply of oxygen can be interrupted. For such measures an effective sealing of the zone 2' must be assured at least relative to the cockpit and also relative to the passenger cabin. The pilots are constantly informed regarding the status or the behavior of the persons in the safety zone 2' through the installed monitoring sensorics 24 and 31. Video cameras 24, 31 may be used as components of the monitoring sensorics. These cameras are interconnected with a monitoring monitor in the cockpit 1. A decision regarding the actual access to the cockpit 1 through the door 25 and regarding the presence of persons in the safety zone 2' can be left preferably to the pilots and can, for example be achieved by means of a central locking controllable from the cockpit 1.

Summarizing, it can be stated that with the suggested apparatus it is prevented to a large extent that unauthorized persons can penetrate into the cockpit and neutralize the functions of the pilots or of the components necessary for operations. Also in case of a terrorist attack when it comes to taking hostages or a threatened use of force, the pilots are protected in the cockpit 1 and can steer a course for a possible rescue. In order to increase in such a scenario the chance for a liberation after the landing, it is further provided according to an embodiment of the invention that the pilots blow off the exit doors and/or emergency exits and activate emergency chutes through an emergency switch, not shown in the drawings. Thereby, not only the passengers have an opportunity of a rapid evacuation, also the alerted security forces can become active on the ground. In order to avoid an erroneous triggering of the evacuation system during flight, a ground distance sensor, or other measures are to be provided which permit a triggering of the evacuation system only when the aircraft is on the ground and at a standstill.

The invention claimed is:

1. An apparatus for improving the safety of an aircraft comprising an aircraft boarding area (2) located between a cockpit (1) and a passenger cabin (3) of said aircraft said boarding area normally providing access to said passenger cabin and to said cockpit, said apparatus further comprising an entrance door (21) for entering said boarding area (2) of said aircraft from outside, said apparatus further comprising means for converting said boarding area into a safety zone (2') between said cockpit (1) and said passenger cabin (3) for inspecting passengers in said safety zone, said means for converting comprising a first controllable safety cockpit access door (25) positioned between said safety zone (2') and said cockpit (1) and a second controllable safety cabin access door (26) positioned between said safety zone (2') and said passenger cabin (3), said means for converting further comprising a first sensor (24) positioned for monitoring said safety zone (2') and a further sensor (31) positioned for monitoring said second controllable safety cabin access door (26), and controls for operating said first and second controllable access safety doors into said cockpit and into said passenger cabin, said controls comprising any one of a manually operable control, an automatic light barrier trigger (32) and a release device, for closing and locking, prior to passenger embarkation on the ground, said first and second controllable safety access doors, while said entrance door is open so that a passenger can enter said safety zone (2') for inspecting said passenger in said safety zone (2'), said controls further permitting unlocking and opening said second controllable safety access door (26) to said passenger cabin (3) while keeping said first controllable safety access door (25) to said cockpit closed and locked, whereby a passenger having passed inspection can enter said passenger cabin but is prevented from entering said cockpit (1).

2. The apparatus of claim 1, wherein said release device is responsive to any one of code numbers, a chip card and an electronic recognition of body features.

3. The apparatus of claim 1, wherein said first sensor (24) and said further sensor (31) comprise video cameras, said means for converting further comprising a monitor in said cockpit, said monitor being operatively connected to said video cameras.

4. The apparatus of claim 1, wherein said first and second controllable safety access doors comprise any one of safety sliding doors, safety folding doors, safety roller doors and safety hinged doors.

5. The apparatus of claim 1, further comprising means for incapacitating a person in said safety zone when said entrance door and said first and second controllable safety access doors are closed and locked, said means for incapacitating comprising any one of means for anesthetization and means for oxygen reduction.

6. The apparatus of claim 1, further comprising sealing means for sealing said entrance door and said first and second controllable safety access doors.

7. The apparatus of claim 1, further comprising in said cockpit an emergency switch for evacuating said aircraft.

8. The apparatus of claim 1, wherein said first sensor (24) is positioned inside said safety zone for monitoring said safety zone and wherein said further sensor (31) is positioned inside said passenger cabin in a location for monitoring said second controllable safety cabin access door into said passenger cabin and for monitoring a space next to said second controllable safety cabin access door inside said passenger cabin, and wherein said first and further sensors are components of a monitoring system for controlling said safety zone and said space next to said second controllable safety cabin access door inside said passenger cabin.

9. The apparatus of claim 7, wherein said emergency switch in said cockpit is linked to any one of an explosive for blowing off aircraft doors and an emergency chute deployment, said emergency switch being activatable only when said aircraft is on the ground.

10. A method for improving the safety of an aircraft, said method comprising the following steps:
    a) converting an entrance area having an entrance door, said entrance area being located between a cockpit and a passenger cabin of said aircraft, into a safety zone by means of a first controllable access door between said safety zone and said cockpit, by means of a second controllable access door between said safety zone and said passenger cabin and by means of sensors,
    b) closing and locking, prior to passenger embarkation on the ground, said first and second controllable access doors,
    c) permitting a passenger to enter into said safety zone through said entrance door while said first and second access doors remain locked,
    d) inspecting a passenger present in said safety zone while said first and second controllable access doors remain looked, and
    e) unlocking and opening said second controllable access door into said cabin when said passenger has passed inspection to permit the passenger to enter the passenger cabin while maintaining said first controllable access door to said cockpit closed and locked.

11. The method of claim 10, further comprising incapacitating a person unpermissibly present in said safety zone while all doors are closed and locked by any one of introducing anesthesia means into said safety zone and withdrawing oxygen from said safety zone.

12. The method of claim 10, further comprising during starting, during flight and during landing the following steps:
    f) keeping said first and second controllable access doors normally closed and locked,
    g) generating sequentially door unlocking and opening signals for said first and second controllable access doors by any one of a control switch and a release device, in response to a person monitoring check so that said second controllable access door (26) to said passenger cabin can be opened first, then closed and locked again following the entry of a monitored and permitted person into said safety zone (2'), and
    h) then unlocking and opening said first controllable access door into said cockpit, while said second controllable access door remains closed and locked.

13. The method of claim 12, further comprising incapacitating a person unpermissibly present in said safety zone while all doors are closed and locked by any one of introducing anesthesia means into said safety zone and withdrawing oxygen from said safety zone.

* * * * *